United States Patent [19]
Vincent

[11] Patent Number: 4,779,646
[45] Date of Patent: Oct. 25, 1988

[54] FLUID FLOW CONTROL VALVE

[75] Inventor: Richard A. Vincent, Old Hickory, Tenn.

[73] Assignee: TRW Inc., Lyndhurst, Ohio

[21] Appl. No.: 73,518

[22] Filed: Jul. 15, 1987

[51] Int. Cl.[4] ............................................. F15B 13/04
[52] U.S. Cl. .............................. 137/625.24; 91/375 A; 91/467
[58] Field of Search ............................ 91/375 A, 467; 137/625.23, 625.24

[56] References Cited

U.S. PATENT DOCUMENTS

| | | | |
|---|---|---|---|
| 4,218,041 | 8/1980 | Bernat | 137/625.4 X |
| 4,313,467 | 2/1982 | Lang | 137/625.3 |
| 4,471,808 | 9/1984 | Thomsen et al. | |
| 4,512,548 | 4/1985 | Keller | |
| 4,540,024 | 9/1985 | Bacardit | |
| 4,570,736 | 2/1986 | Waldorf | 137/625.23 |
| 4,651,776 | 3/1987 | Nakano et al. | 137/625.3 X |

Primary Examiner—Gerald A. Michalsky
Attorney, Agent, or Firm—Tarolli, Sundheim & Covell

[57] ABSTRACT

A valve for controlling fluid flow comprising first and second relatively movable valve members. The first valve member has a first fluid cavity. The second valve member has a second fluid cavity. The second valve member has a land partially defining the second fluid cavity. The land has an outer surface portion and edges on the opposite sides of the outer surface portion. The land has edges on the respective opposite sides of the surface portion. The valve members are relatively movable from the neutral position for directing fluid flow between the first and second fluid cavities across one edge of the land upon relative movement therebetween. A groove in the surface portion of the land provides a reservoir of fluid to be drawn into the fluid flow across the one edge of the land.

9 Claims, 3 Drawing Sheets

FLUID FLOW CONTROL VALVE

BACKGROUND OF THE INVENTION

1. Technical Field

The present invention relates to a fluid flow control valve, and particularly to a control valve for a vehicle hydraulic power steering gear.

2. Background Art

A fluid flow control valve includes first and second relatively movable valve members. A first valve member has a first fluid cavity, and a second valve member has a second fluid cavity. A land (projection) on one of the valve members has an outer surface extending between opposite edges. The land directs and controls fluid flow between the first and second fluid cavities upon relative movement of the valve members. The fluid flows across an edge of the land from one fluid cavity to another at relatively high velocity. Fluid tends to separate from the outer surface of the land and create turbulence during this high velocity flow. Noise often results because of this turbulence.

This problem occurs in a fluid flow control valve for a vehicle hydraulic power steering gear. A fluid flow control valve for a hydraulic power steering gear includes a valve sleeve and a valve core. The valve sleeve is tubular and has a plurality of longitudinally extending grooves (fluid cavities) in its inner surface. The valve core is coaxially disposed within the valve sleeve. The valve core has a cylindrical configuration with a plurality of axially extending grooves (fluid cavities) in its outer surface.

The valve sleeve and valve core are relatively rotatable to direct and control fluid flow between a pair of assist chambers of the hydraulic power steering gear. A respective land separates adjacent grooves (fluid cavities) in the valve core. A respective land also separates adjacent grooves (fluid cavities) in the valve sleeve. A land on the valve core is located centrally of a respective groove in the valve sleeve when the valve sleeve and valve core are in a neutral or centered position.

When the valve sleeve and valve core are in their neutral position, equal fluid communication is provided from an inlet passage, which communicates with a fluid pump, to (i) the assist chambers and (ii) reservoir. Upon relative rotation of the valve core and valve sleeve, one land moves to increase fluid communication between the inlet passage and one assist chamber and decrease communication of the assist chamber with the reservoir. Another land moves to decrease fluid communication between the inlet passage and the other assist chamber and increase communication of the other assist chamber with the reservoir. The fluid pressure in the inlet passage is relatively high. Thus, fluid flows at a high velocity across an edge of the other land from the inlet passage to the reservoir during relative rotation of the valve core and valve sleeve. This results in turbulence and undesirable noise.

SUMMARY OF THE INVENTION

A valve according to the present invention includes first and second relatively movable valve members. The first valve member has a first fluid cavity. The second valve member has a second fluid cavity. The second valve member has a land partially defining the second fluid cavity for controlling fluid flow between the first and second fluid cavities. The land has an outer surface portion extending between opposite land edges. The valve members are movable from a neutral position to direct fluid flow between the first and second cavities across an edge of the land. A groove is in the outer surface portion of the land. The groove provides a reservoir for fluid which can be drawn into the fluid flow across the outer surface portion of the land. This results in minimizing turbulent flow caused by separation of the fluid from the outer surface of the land, and thus minimizes noise.

The present invention may be embodied in a variety of different valves. However, it is particularly useful in a valve for a hydraulic power steering gear. The fluid reservoir is provided on the outer surface of the lands which separate the axial grooves. When fluid flows at a relatively high velocity from the inlet passage across a land edge, turbulence is minimized by fluid from the fluid reservoir being drawn into the high velocity stream.

BRIEF DESCRIPTION OF THE DRAWINGS

Further objects, features and advantages of the present invention will become apparent to those skilled in the art to which the present invention relates from reading the following specification with reference to the accompanying drawings, in which.

DESCRIPTION OF A PREFERRED EMBODIMENT

Figure 1:
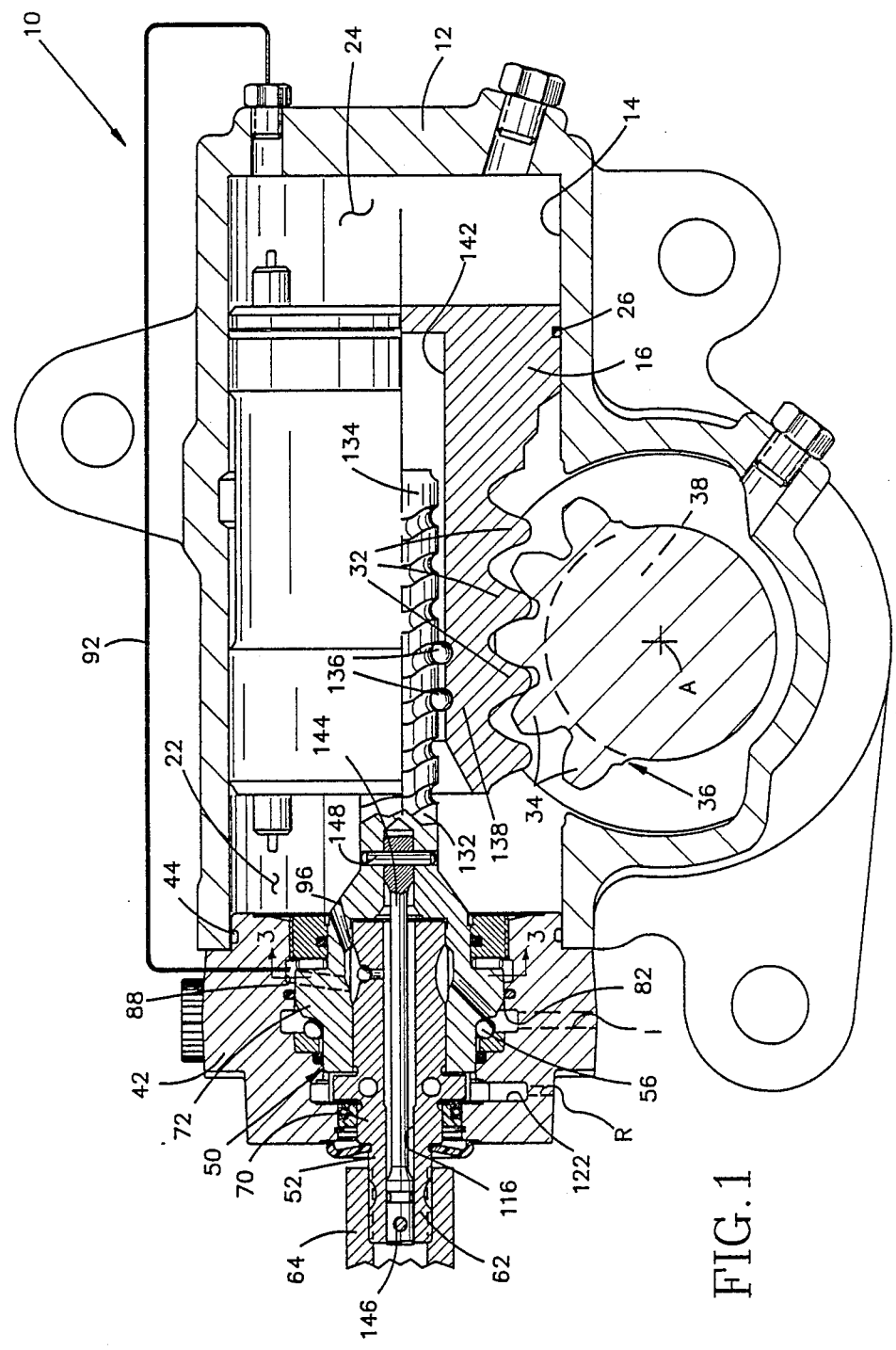
FIG. 1 is a longitudinal sectional view of a hydraulic power steering gear having a fluid flow control valve of the present invention.

The present invention is applicable to fluid flow control valves of a variety of constructions and uses. A control valve embodying the present invention is illustrated, by way of example, in a hydraulic power steering gear 10 for turning the dirigible wheels of a vehicle.

The power steering gear 10 includes a housing 12 having an inner cylindrical surface defining a chamber 14. A piston 16 divides the chamber 14 into opposite assist chamber portions 22 and 24 located at axially opposite ends of the piston 16. An O-ring 26 is carried in a groove in the piston 16 and provides a fluid seal between the chamber portions 22 and 24.

A series of rack teeth 32 are formed in a portion of the outer periphery of the piston 16. The rack teeth 32 mesh with teeth 34 formed on a sector gear 36. The sector gear 36 is fixed to an output shaft 38 which extends outwardly from the steering gear 10 through an opening in the housing 12. The output shaft 38 is typically connected to a pitman arm (not shown), which in turn is connected to the mechanical steering linkage of the vehicle. Thus, as the piston 16 moves axially within the chamber 14, the output shaft 38 rotates about its longitudinal central axis A to operate the steering linkage, as will be understood by those skilled in the art.

An end cap 42 is attached to the housing 12 by conventional means, such as fasteners (not shown). An O-ring 44 is disposed in a groove in the end cap 42 to prevent fluid leakage from the chamber portion 22. The end cap 42 includes a fluid inlet passage I and a fluid return passage R. The inlet passage I and return passage R are adapted to be connected in fluid communication with hydraulic circuitry including a power steering pump (not shown). A valve assembly 50 directs and controls fluid flow between the passages I, R and the chamber portions 22, 24.

Pressurized fluid is directed from the inlet passage I to one of the assist chamber portions 22 or 24 by the valve assembly 50. Simultaneously, fluid from the other of the assist chamber portions 22 or 24 is directed by the valve assembly 50 to the return passage R which is connected with a reservoir of the power steering pump. The valve assembly 50 is actuated by a manually rotatable input shaft 52. An outer end portion 62 of the input shaft 52 is splined for receiving a portion of a shaft 64 thereon. The shaft 64 is connected with a steering wheel which is manually turned by the vehicle operator to effect steering of the vehicle.

The valve assembly 50 includes a valve core member 70 and a valve sleeve member 72. The valve core member 70 is located coaxially within the valve sleeve member 72. The valve sleeve member 72 is supported for rotation by a bearing 56 located in the end cap 42. The valve core member 70 is supported by the valve sleeve member 72 for relative rotation. The amount of relative rotation between the valve members 70, 72 is generally limited to about 4° in either direction from a neutral (centered) position, as illustrated in FIG. 3.

The valve sleeve member 72 has three radial inlet passages 74 extending between its outer surface 76 and its inner surface 78. The radial inlet passages 74 are equally spaced about the valve sleeve member 72. The radial inlet passages 74 communicate with an annulus 82 (FIG. 1) in the housing 12. The annulus 82 in turn is connected with the inlet passage I and is thus subjected to the fluid pressure from the power steering pump.

Figure 3:
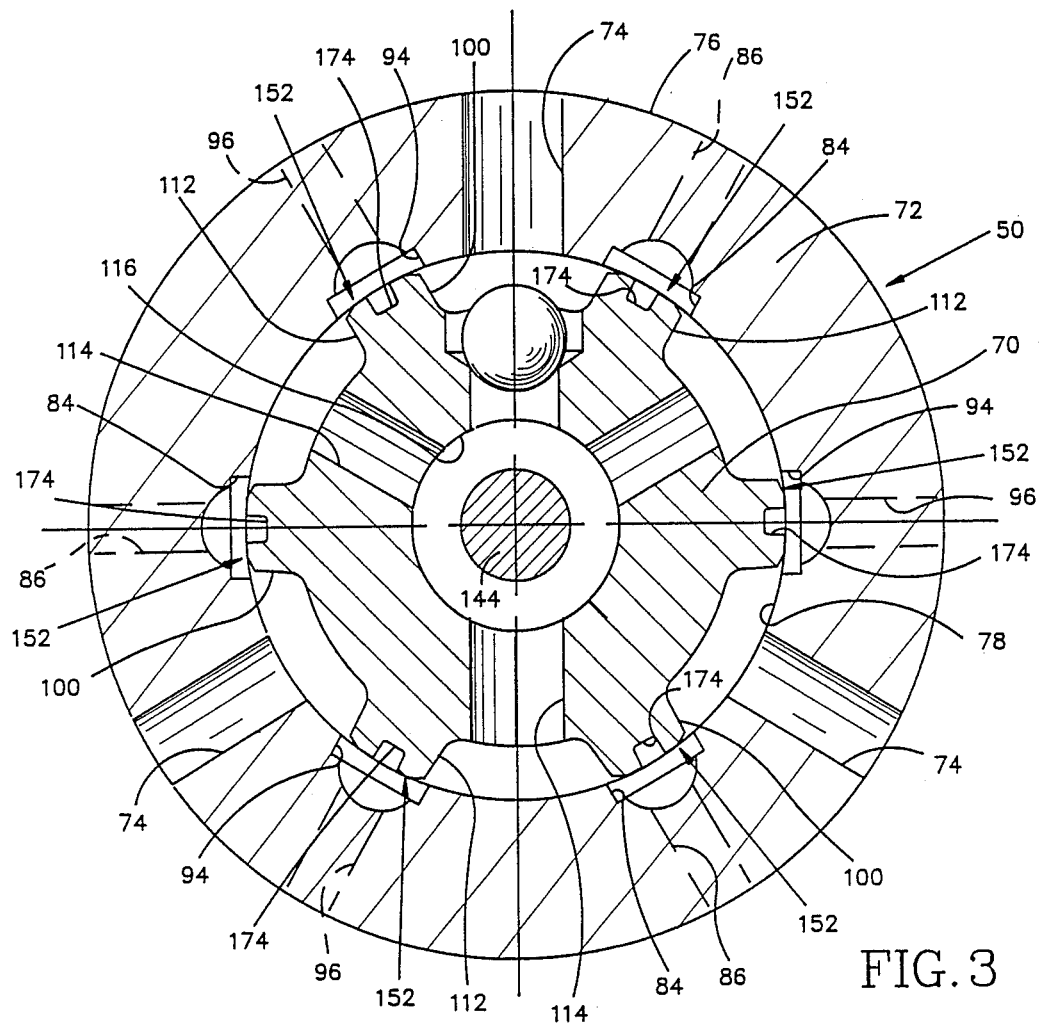
FIG. 3 is a cross sectional view of the steering gear of FIG. 1 showing a fluid flow control valve and taken approximately along line 3—3 of FIG. 1.

On the inner surface 78 of the valve sleeve member 72 are three axially extending grooves or fluid cavities 84 (FIG. 3). The grooves 84 are equally spaced around the inner surface of the valve sleeve member 72. Each of the grooves 84 communicate with a respective radially extending passage 86. The passages 86 communicate with an annulus 88 (FIG. 1) in the housing 12. The annulus 88 communicates with a suitable fluid passage 92 which in turn communicates with the assist chamber portion 24. The valve sleeve member 72 (FIG. 3) further includes three other axially extending grooves or fluid cavities 94 in the inner surface 78. The grooves 94 are equally spaced around the inner surface 78 of the valve sleeve member 72. Each of the grooves 94 communicates with a respective passage 96 which extends through the valve sleeve member 72 and communicates with the assist chamber portion 22.

Figure 2:
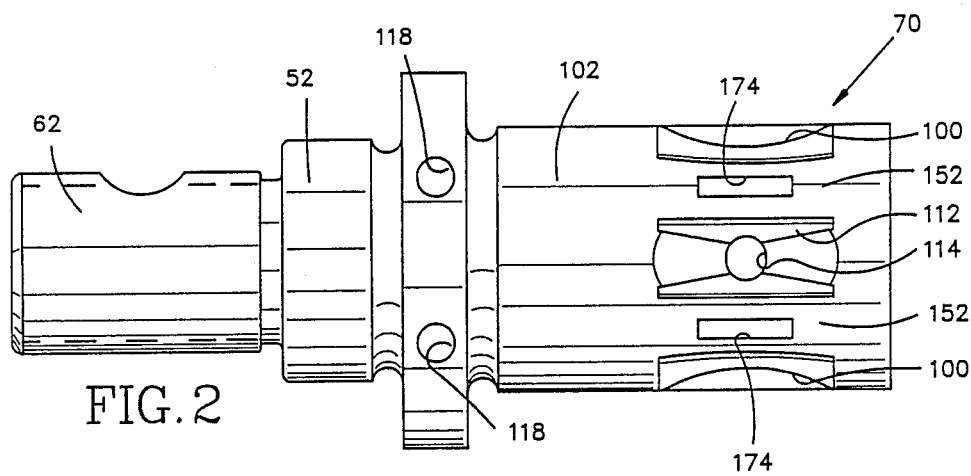
FIG. 2 is an elevational view of a valve core used in the steering gear of FIG. 1.

The valve core member 70 (FIG. 2) has an elongated cylindrical configuration and is integrally formed as one piece with the input shaft 52. The valve core member 70 has a plurality of axially extending grooves in its outer circumference. Three grooves or fluid cavities 100 (FIG. 3) are equally spaced about the outer surface 102 of the valve core member 70 and communicate with the inlet passages 74 in the valve sleeve member 72. The circumferential extent of the grooves 100 around the outer surface 102 of the valve core member 70 is such that each of the grooves communicate equally with respective grooves 84 and 94 of the valve sleeve member 72 when the valve core member 70 is in the "centered" or neutral position relative to the valve sleeve member.

Axially extending grooves 112 are also equally spaced about the outer circumference 102 of valve core member 70 and located intermediate the grooves 100. Each of the grooves 112 communicate with a respective radial passage 114 which extends between each groove 112 and an internal axial passage 116 of the valve core member 70. The internal passage 116 of the valve core member 70 also communicates with four radially directed passages 118 (FIG. 2) extending through the valve core member. The radially directed passages 118 communicate with an annulus 122 (FIG. 1) in the housing 12. The annulus 122 in turn communicates with the return passage R in the housing 12.

A follow-up member 132 (FIG. 1) has a screw thread portion 134 formed in its outer periphery. An internal screw thread portion 138 is formed in a bore 142 of the piston 16. A plurality of balls 136 are located in the screw thread portions 134, 138 to transmit force therebetween. Axial movement of the piston 16 within the chamber 14 causes the follow-up member 132 to rotate, as is well known. The valve sleeve member 72 is connected with the follow-up member 132. Thus, the valve sleeve member 72 rotates with the follow-up member 132.

A torsion bar 144 is connected between the input shaft 52 and the follow-up member 132 by pins 146, 148, respectively. Thus, when the valve core member 70 is rotated relative to the valve sleeve member 72 away from the neutral position, the piston 16 moves axially within the chamber 14. When steering is terminated, the follow-up member 132 and the valve sleeve member 72 rotate relative to valve core member 70 and return to the neutral position.

When the valve members 70, 72 are in the neutral position, the fluid pressure in annulus 82 is communicated through the radial passages 74 in the valve sleeve member and into the grooves 100. Fluid in grooves 100 communicates equally with the grooves 84, 94 and passages 86, 96. Equal fluid pressure is delivered to the assist chamber portions 22 and 24 and the piston 16 does not move within the chamber 14, thus, no power steering assist is provided.

When the valve core member 70 is rotated clockwise relative to the valve sleeve member 72 from the position viewed in FIG. 3, fluid communication between grooves 94 and the radial inlet passages 74 is restricted. The grooves 84 are simultaneously placed in greater fluid communication with the grooves 100 communicating with the radial inlet passages 74. Thus, fluid flows from the grooves 84 through passages 86 and into the annulus 88 in the housing 12. The fluid flows from the annulus 88 through the passage 92 to the assist chamber portion 24.

Simultaneously, fluid from the assist chamber portion 22 flows through the passages 96 into the groove 94 in the inner surface 78 of the valve sleeve member 72. The fluid flows from the grooves 94 of the valve sleeve member 72 into the grooves 112 in the valve core member 70. The fluid then flows from the grooves 112 through passages 114 into the internal passage 116 of the valve core member 70. The fluid is conducted through the internal passage 116, through the passages 118 and into the annulus 122 which is connected with the return passage R in the housing 12. Pressurizing the assist chamber portion 24 and venting the assist chamber portion 22 causes the piston 16 to move to the left, as viewed in FIG. 1, to rotate the sector gear 36 counterclockwise about the axis A to provide power steering assist.

If the valve core member 70 is rotated in a counterclockwise direction relative to the valve sleeve member 72 from the position of FIG. 3, the fluid in the grooves 100 communicating with the inlet passages 74 flows into the grooves 94 in the inner surface 78 of the valve sleeve member 72 and through the passages 96 into the assist chamber portion 22. The fluid from the assist chamber portion 24 simultaneously flows through the passage 92, annulus 88, passages 86, grooves 84 in the inner surface 78 of the valve sleeve member 72, grooves 112 in the outer surface 102 of the valve core member 70, passages 114, 116 and 118 in the valve core member 70 to the annulus 122 which is in communication with the return passage R. Pressurizing the assist chamber portion 22 and venting the assist chamber portion 24 causes the piston 16 to move to the right, as viewed in FIG. 1 to rotate the sector gear 36 clockwise about the axis A to provide power steering assist.

The valve core member 70 (FIG. 2) has a plurality of axially extending lands 152. Each of the plurality of lands 152 separates a pair of adjacent grooves 100, 112 in the valve core member 70. Each land 152 is disposed adjacent a respective groove 84 or 94 for controlling fluid flow between the grooves 100 in the valve core member 70 and the grooves 84, 94 in the valve sleeve member 72.

Each of the lands 152 (FIGS. 4 and 5) has a pair of opposite side surfaces 154. The opposite side surfaces 154 are preferably parallel, but it should be obvious that other configurations of the side surfaces may be used. The land 152 also has an arcuate outer surface portion 162 centered with respect to and facing one of the grooves 84 or 94 in the valve sleeve member 72 when the valve core member 72 is in the neutral position. Ramps or chamfered surfaces 156, 156a interconnect the outer surface portion 162 of the land 152 and a respective side surface 154. The chamfered surface 156 and outer surface portion 162 intersect to form opposite edges 164 of the land 152. The chamfered surface 56a provides for a gradual restriction of the fluid flow from the groove 100 to the groove 94.

Figure 4:
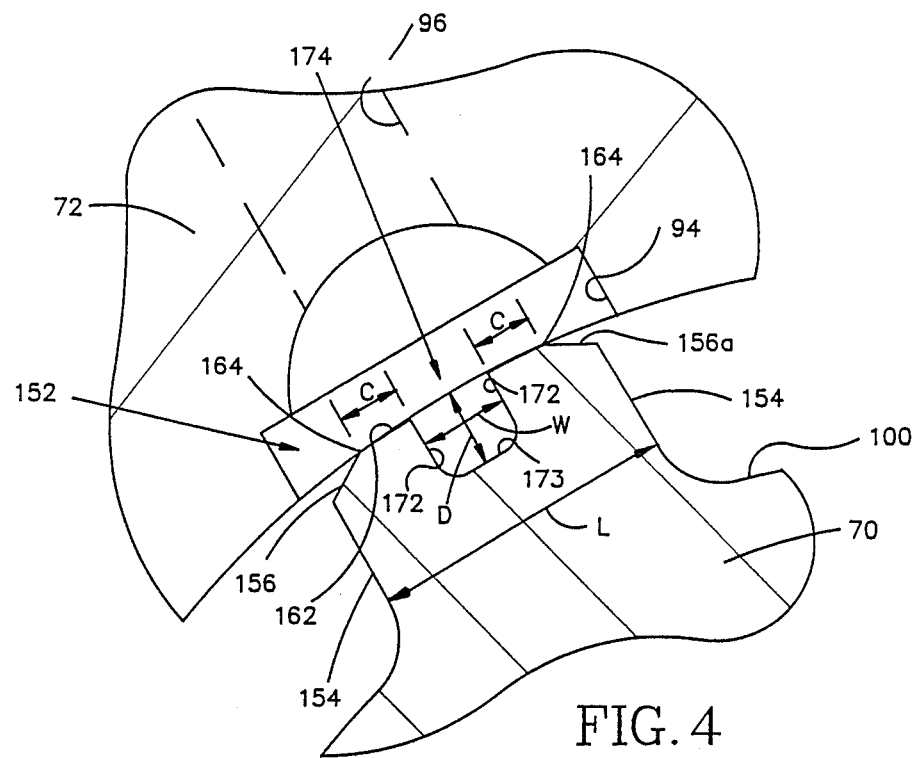
FIG. 4 is an enlarged view of a portion of the fluid flow control valve of FIG. 3 in a neutral position.
Figure 5:
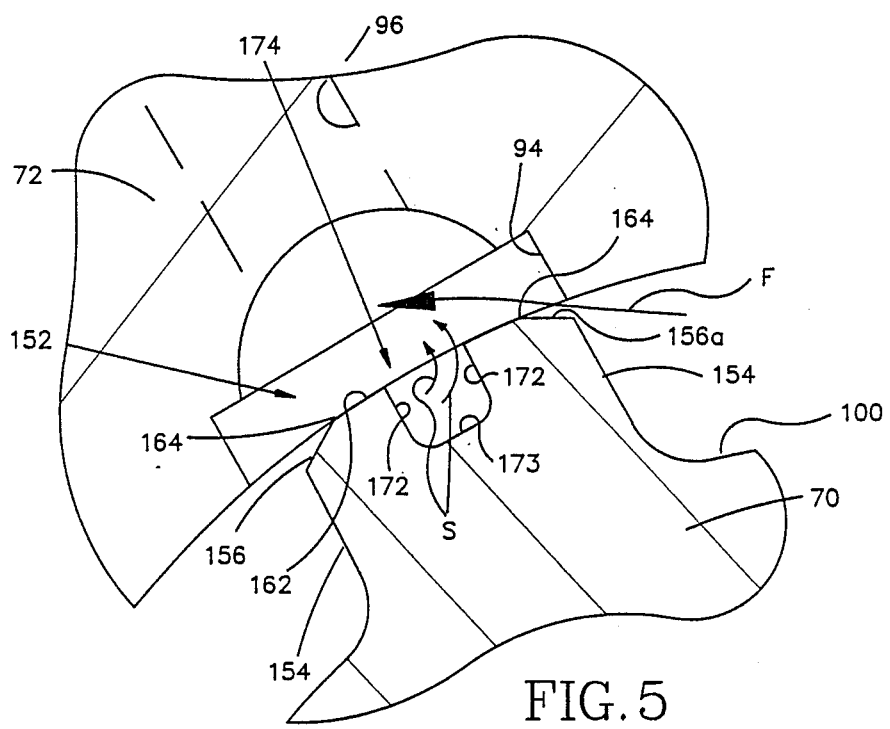
FIG. 5 is a view similar to FIG. 4 with the parts in a different position.

Upon clockwise rotation of the valve core member 72 the land 152 moves from the neutral position illustrated in FIG. 4 to the position illustrated in FIG. 5. The land 152 moves to restrict fluid flow between the groove 100 and the groove 94. Fluid flows over the chamfered surface 156, across edee 164 and the outer surface 162 of the land 152 as indicated by F. This fluid flow F is at a relatively high velocity. While the fluid flow F occurs at a relatively high velocity, the flow is subsonic.

In order to minimize noise, each land 152 has surfaces 172, 173 which define a groove 174 in the outer surface portion 162 of the land 152. The surfaces 172 preferably extend parallel to one another and parallel to the longitudinal central axis of the valve core member 72. The surface 173 is preferably perpendicular to the surfaces 172. The groove 174 is a reservoir for fluid. When the fluid flows across an edge 164 of the land 152 at the relatively high velocity, fluid may be drawn by fluid flow F from the groove 174 as indicated by the arrows S. The groove 174 is located in a central portion of the outer surface portion 162 of the land 152. High velocity fluid flow F draws fluid from the groove 174, and thus fluid does not separate from the face of the land 152, as in heretofore known fluid flow control valves. Thus, turbulence is minimized and noise is minimized.

The groove 174 is sized to have a sufficient volume of the working fluid to provide an adequate supply of the fluid during a period of relatively high velocity fluid flow. The groove 174 preferably has a width W, as measured along a line perpendicular to the opposite side surfaces 172 of the groove (FIG. 4), of at least one fourth of the width L of the land 152. The width L is measured along a line perpendicular to the side surfaces 154 of the land. In the preferred embodiment, the land 152 has a width L of approximately 0.225". The groove 174 also extends for a depth D, which is at least one fifth of the width L of the land 152. The depth D at the center of the groove is measured along a line perpendicular to the surface 173.

Preferably, the outer surface portion 162 of the land 152 which extends between the chamfered edge 156 and the side surface 172 which partially defines the groove 174 has a dimension C of not less than 0.03" to restrict fluid flow between the grooves 100, 94 when relative rotation between the valve core member 72 and valve sleeve member 70 occurs. Fluid separation from the surfaces 172, 173 defining the groove 174 does not occur because the velocity of the fluid passing over these surfaces is at a relatively low velocity compared to the relatively high velocity fluid flow F because the surfaces 172, 173 are isolated from the stream of the fluid flow F. Thus, noise is minimized.

From the above description of a preferred embodiment of the invention, those skilled in the art will perceive improvements, changes and modifications. Such improvements, changes and modifications within the skill of the art are intended to be covered by the appended claims.

Having described a preferred embodiment of the present invention, I claim:

1. A fluid flow control valve for a vehicle power steering system, said fluid flow control valve comprising:
    a tubular valve sleeve member having a surface defining a bore extending coaxially of said valve sleeve member and a plurality of axially extending valve sleeve grooves, adjacent valve sleeve grooves being separated by a respective one of a plurality of valve sleeve lands;
    a cylindrical valve core member disposed coaxially within the bore in said valve sleeve member and rotatable relative to said valve sleeve member, said valve core member having a plurality of axially extending valve core grooves, adjacent valve core grooves being separated by a respective one of a plurality of valve core lands, said valve core lands having a circumferential dimension less than the circumferential dimension of said valve sleeve grooves, each of said valve core lands having a neutral position facing a respective one of said valve sleeve grooves and centered relative to said respective one of said valve sleeve grooves, upon relative rotation of said valve core member and said valve sleeve member from said neutral position said valve core lands cooperating with said valve sleeve lands resulting in a relatively high velocity fluid flow over a portion of at least one of said valve core lands; and
    fluid reservoir means from which fluid may be drawn by the relatively high velocity fluid flow over said portion of said one valve core land, said fluid reservoir means being located in said one valve core land.

2. The fluid flow control valve set forth in claim 1 wherein said fluid reservoir means comprises a longitudinally extending reservoir groove in said one valve core land, said reservoir groove being centrally located between adjacent valve core grooves on opposite sides of said one valve core land, said reservoir groove being defined by a pair of side surfaces extending in a direction parallel to the longitudinal central axis of said valve core member.

3. The fluid flow control valve set forth in claim 2 wherein said reservoir groove has a width defined as the perpendicular distance between said pair of side surfaces which is at least one fourth the width of said valve core land defined as the perpendicular distance between adjacent valve core grooves, said reservoir groove also having a depth which is at least one fifth the width of said valve core land.

4. A valve for controlling fluid flow, said valve comprising:
a first valve member having a surface defining a bore and a plurality of grooves, adjacent grooves in said first valve member being separated by a respective one of a plurality of lands on said first valve member;
a second valve member disposed within the bore in said first valve member and movable relative to said first valve member, said second valve member having a plurality of grooves, adjacent grooves in said second valve member being separated by a respective one of a plurality of lands on said second valve member, each of said lands on said second valve member having a neutral position facing a respective one of said grooves in said first valve member and centered relative to the respective one of said grooves in said first valve member, upon relative movement of said first valve member and said second valve member from said neutral position said lands on said first valve member cooperate with said lands on said second valve member resulting in a relatively high velocity fluid flow over a portion of at least one of said lands on said second valve member; and
fluid reservoir means on said one of said lands on said second valve member from which fluid may be drawn by the relatively high velocity fluid flow over said portion of said one land on said second valve member, said fluid reservoir means located in said one land on said second valve member centrally between adjacent grooves on opposite sides of said one land on said second valve member and downstream in the fluid flow path of said portion of said one land on said second valve member over which the relatively high velocity fluid flows.

5. The fluid flow control valve set forth in claim 4 wherein said first valve member comprises a tubular sleeve, said second valve member comprises a cylindrical core having a longitudinal central axis and being disposed coaxially within said sleeve, said core and said sleeve being relatively rotatable, said fluid reservoir means comprises an axially extending reservoir groove in said one land on said core, said reservoir groove being defined by a pair of side surfaces extending in a direction parallel to the longitudinal central axis of said core.

6. The fluid flow control valve set forth in claim 4 wherein said fluid reservoir means comprises a reservoir groove, said reservoir groove having a width defined as the perpendicular distance between a pair of side surfaces defining the groove which is at least one fourth the width of said land on said second valve member defined as the perpendicular distance between adjacent grooves in said second valve member, and said reservoir groove having a depth which is at least one fifth the width of said land on said second valve member.

7. An apparatus comprising an elongate member having a plurality of axially extending grooves, adjacent grooves being separated by a respective one of a plurality of axially extending lands, an axially extending reservoir groove being located in at least one of said plurality of lands and centered on said one land, said reservoir groove defining a fluid cavity from which fluid may be drawn by fluid flowing over a portion of said one land, said reservoir groove being located downstream of said portion of said one land over which fluid flows.

8. The apparatus set forth in claim 7 wherein said reservoir groove has a width which is at least one fourth the perpendicular distance between a pair of adjacent grooves on opposite sides of said one land.

9. The apparatus set forth in claim 8 wherein said reservoir groove has a depth which is at least one fifth the perpendicular distance between a pair of adjacent grooves on opposite sides of said one land.

* * * * *